US007206724B2

(12) United States Patent
Chen

(10) Patent No.: US 7,206,724 B2
(45) Date of Patent: Apr. 17, 2007

(54) METHOD FOR DESIGNING A BLOWER WHEEL SCROLL CAGE

(75) Inventor: Yuqi Chen, Laverge, TN (US)

(73) Assignee: Whirlpool Corporation, Benton Harbor, MI (US)

( * ) Notice: Subject to any disclaimer, the term of this patent is extended or adjusted under 35 U.S.C. 154(b) by 656 days.

(21) Appl. No.: 10/701,206

(22) Filed: Nov. 4, 2003

(65) Prior Publication Data

US 2005/0096767 A1 May 5, 2005

(51) Int. Cl.
*G06F 17/50* (2006.01)
*F04D 29/40* (2006.01)

(52) U.S. Cl. .................. 703/1; 703/7; 703/9; 415/204; 415/206

(58) Field of Classification Search ................ 415/204, 415/206; 29/889.3, 889.6, 407.01, 407.05, 29/407.09; 703/1, 7, 9
See application file for complete search history.

(56) References Cited

U.S. PATENT DOCUMENTS

| | | | | |
|---|---|---|---|---|
| 3,680,328 | A | 8/1972 | McCarty | |
| 4,492,094 | A | 1/1985 | Katayama | |
| 4,877,106 | A | 10/1989 | Neville et al. | |
| 5,738,492 | A | 4/1998 | Stanko et al. | |
| 5,813,834 | A * | 9/1998 | Hopfensperger et al. | 415/206 |
| 6,032,479 | A | 3/2000 | Choi et al. | |
| 6,050,772 | A * | 4/2000 | Hatakeyama et al. | 415/1 |
| 6,146,092 | A * | 11/2000 | Botros et al. | 415/119 |
| 6,339,935 | B1 | 1/2002 | Moretti et al. | |
| 6,412,298 | B2 | 7/2002 | Kang et al. | |
| 6,439,839 | B1 * | 8/2002 | Song et al. | 415/119 |
| 6,478,538 | B2 * | 11/2002 | Kim | 415/204 |
| 6,511,287 | B2 | 1/2003 | Kim | |

OTHER PUBLICATIONS

Peter Konieczny and J. Stuart Bolton; "Design of low-nose centrifugal blowers—Part 2: Optimization study"; Institute of Noise Control Engineering; Noise Control Eng. J. 43 (4); pp. 117-127.*
R.J. Kind and M.G. Tobin; "Flow in a Centrifugal Fan of the Squirrel-Cage Type"; 1990; Transactions of the ASME; Journal of Turbomachinery vol. 112; pp. 84-90.*
Fluent Inc.; "Squirrel Cage Blower"; 2001; Application Briefs from Fluent; pp. 1-2.*
Fluent Inc.; "Flow Modeling Solutions for Fan Design"; 2001; pp. 1-6.*

* cited by examiner

*Primary Examiner*—Paul Rodriguez
*Assistant Examiner*—Jason Proctor
(74) *Attorney, Agent, or Firm*—Robert O. Rice; Stephen Krefman; John F. Colligan

(57) ABSTRACT

A method for determining the shape of a scroll cage for a forward-curved centrifugal blower wheel in a blower housing having a blower cut-off end including determining the blower wheel dimensions, determining the blower wheel clearance, determining the distance from the center of the blower wheel to the discharge point of the scroll cage at the tangential point of the scroll cage and the blower housing, selecting a diffusing angle, calculating a development angle and plotting the scroll cage profile in polar coordinates. The method can include iteratively adjusting the diffusing angle and re-plotting the scroll cage profile and running simulations to determine the optimum profile.

19 Claims, 5 Drawing Sheets

METHOD FOR DESIGNING A BLOWER WHEEL SCROLL CAGE

BACKGROUND OF THE INVENTION

1. Field of the Invention

The invention relates to a method for determining the shape of a blower wheel scroll cage. One application for such a blower wheel scroll cage is for a room air conditioner.

2. Description of the Related Art

Centrifugal blowers having a scroll cage are known for use in air handling devices including room air conditioners. Air systems for window unit room air conditioners are difficult to design due to the compact size of the cabinet. The air system of a room air conditioner having a centrifugal blower wheel can consist of two portions the scroll cage and the discharge hood.

SUMMARY OF THE INVENTION

One embodiment of the invention is a method for determining the shape of a scroll cage for a forward-curved centrifugal blower wheel in a blower housing having a blower cut-off end. The method according to the invention includes the steps of: determine the blower wheel dimensions ($R_{wheel}$xblower wheel depth); calculate $\rho_o$, the radius of a blower circle, comprising the distance from the center of the blower wheel to the blower cut-off end, using the formula: $\rho_o = R_{wheel} + \delta$, where $\delta$, the radial wheel clearance, is selected from the range of: 10 mm$\leqq\delta\leqq$20 mm; determine $\rho_e$, the distance from the center of the blower wheel to the discharge point of the scroll cage at the tangential point of the scroll cage and the blower housing, and calculate b, the difference between $\rho_e$ and $\rho_o$ using the formula: $b=\rho_e-\rho_o$; select a diffusing angle $\alpha$, the angle between the blower circle and the blower cut-off at the blower cut-off end, from the range of: $8°<\alpha<13°$; calculate a development angle $\phi_o$, the polar angle between the radial line from the center of the blower wheel to the blower cut-off end and the radial line from the center of the blower wheel to the discharge point, using the formula: $\phi_o \tan\alpha=(180/\pi)(b/\rho_o)$; and plot the scroll cage profile on polar coordinates starting at the cut-off end using the formula: $\rho=\rho_o+\phi b/\phi_o$ (for $0\leqq\phi\leqq\phi_o$) where $\rho$ is the distance from the center of the blower wheel to the scroll cage and ending at the discharge point at ($\phi_o$, $\rho_e$).

Another aspect of the invention is a method for determining the shape of a scroll cage of a blower housing having a blower cut-off end for a forward-curved centrifugal blower wheel for use in a room air conditioner. The method according to the invention includes the steps of: determine the air flow requirements (CFM) for the room air conditioner; determine the blower wheel dimensions ($R_{wheel}$xblower wheel depth), blower wheel shaft location and blower housing dimensions based on the room air conditioner performance objectives and cabinet dimensions; calculate $\rho_o$, the radius of a blower circle, comprising the distance from the center of the blower wheel to the blower cut-off end, using the formula: $\rho_o=R_{wheel}+\delta$, where $\delta$, the radial wheel clearance, is selected from the range of: 10 mm$\leqq\delta\leqq$20 mm; determine $\rho_e$, the distance from the center of the blower wheel to the discharge point of the scroll cage at the tangential point of the scroll cage and the blower housing, and calculate b, the difference between $\rho_e$ and $\rho_o$ using the formula: $b=\rho_e-\rho_o$; select a diffusing angle $\alpha$, the angle between the blower circle and the blower cut-off at the blower cut-off end, from the range of: $8°<\alpha<13°$; calculate a development angle $\phi_o$, the polar angle between the radial line from the center of the blower wheel to the blower cut-off end and the radial line from the center of the blower wheel to the discharge point, using the formula: $\phi_o \tan\alpha=(180/\pi)(b/\rho_o)$; and plot the scroll cage profile on polar coordinates starting at the cut-off end using the formula: $\rho=\rho_o+\phi b/\phi_o$(for $0\leqq\phi\leqq\phi_o$) where p is the distance from the center of the lower wheel to the scroll cage and ending at the discharge point at ($\phi_o$, $\rho_e$).

Another aspect of the invention is a method for determining the shape of a scroll cage of a blower housing having a blower cut-off end for a forward-curved centrifugal blower wheel for use in a room air conditioner. The method according to the invention includes the steps of: determine the air flow requirements (CFM) for the room air conditioner; determine the blower wheel dimensions ($R_{wheel}$xblower wheel depth), blower wheel shaft location and blower housing dimensions based on the room air conditioner performance objectives and cabinet dimensions; calculate $\rho_o$, the radius of a blower circle, comprising the distance from the center of the blower wheel to the blower cut-off end, using the formula: $\rho_o=R_{wheel}+\delta$, where $\delta$, the radial wheel clearance, is selected from the range of: 10 mm$\leqq\delta\leqq$20 mm; determine $\rho_e$, the distance from the center of the blower wheel to the discharge point of the scroll cage at the tangential point of the scroll cage and the blower housing, and calculate b, the difference between $\rho_e$ and $\rho_o$ using the formula: $b=\rho_e-\rho_o$; select a diffusing angle $\alpha$, the angle between the blower circle and the blower cut-off at the blower cut-off end, from the range of: $8°<\alpha<13°$; calculate a development angle $\phi_o$, the polar angle between the radial line from the center of the blower wheel to the blower cut-off end and the radial line from the center of the blower wheel to the discharge point, using the formula: $\phi_o \tan\alpha=(180/\pi)(b/\rho_o)$; plot the scroll cage profile on polar coordinates starting at the cut-off end using the formula: $\rho=\rho_o+\phi b/\phi_o$ (for $0\leqq\phi\leqq\phi_o$) where $\rho$ is the distance from the center of the blower wheel to the scroll cage and ending at the discharge point at ($\phi_o$, $\rho_e$); run a computational fluid dynamics (CFD) simulation of the blower performance for the scroll cage profile plotted; confirm a blower wheel having dimensions $R_{wheel}$xblower wheel depth is capable of producing required airflow (CFM) at the design blower wheel rotation speed; modify the diffusing angle $\alpha$, and calculate a new development angle $\phi_o$; plot a new scroll cage profile using the formula: $\rho=\rho_o+\phi b/\phi_o$ (for $0\leqq\phi\leqq\phi_o$); run a CFD simulation of blower performance for the new scroll cage profile plotted to determine which scroll cage profile provides the best blower performance.

Another aspect of the invention is a method for determining the shape of a scroll cage of a blower housing having a blower cut-off end for a forward-curved centrifugal blower wheel for use in a room air conditioner. The method according to the invention includes the steps of: determine the air flow requirements (CFM) for the room air conditioner; determine the blower wheel dimensions ($R_{wheel}$xblower wheel depth), blower wheel shaft location and blower housing dimensions based on the room air conditioner performance objectives and cabinet dimensions; calculate $\rho_o$, the radius of a blower circle, comprising the distance from the center of the blower wheel to the blower cut-off end, using the formula: $\rho_o=R_{wheel}+\delta$, where $\delta$, the radial wheel clearance, is selected from the range of: 10 mm$\leqq\delta\leqq$20 mm; determine $\rho_e$, the distance from the center of the blower wheel to the discharge point of the scroll cage at the tangential point of the scroll cage and the blower housing, and calculate b, the difference between $\rho_e$ and $\rho_o$ using the formula: $b=\rho_e-\rho_o$; select a diffusing angle $\alpha$, the angle between the blower circle and the blower cut-off at the blower cut-off end, from the range of: 8°<α<13°; calculate a development angle $\phi_o$, the polar angle between the radial line from the center of the blower wheel to the blower cut-off end and the radial line from the center of the blower wheel to the discharge point, using the formula: $\phi_o \tan \alpha=(180/\pi)(b/\pi_o)$; plot the scroll cage profile on polar coordinates starting at the cut-off end using the formula: $\rho=\rho_o+\phi b/\rho_o$ (for $0 \leqq \phi \leqq \phi_o$) where ρ is the distance from the center of the blower wheel to the scroll cage and ending at the discharge point at $(\phi_o, \rho_e)$; run a computational fluid dynamics (CFD) simulation of the blower performance for the scroll cage profile plotted; confirm a blower wheel having dimensions $R_{wheel}$×blower wheel depth is capable of producing required airflow (CFM) at the design blower wheel rotation speed; modify the diffusing angle α, and calculate a new development angle $\phi_o$; plot a new scroll cage profile using the formula: $\rho=\rho_o+\phi b/\phi_o$ (for $0 \leqq \phi \leqq \phi_o$); run a CFD simulation of blower performance for the new scroll cage profile plotted to determine which scroll cage profile provides the best blower performance; and iteratively repeating the steps of modifying the diffusing angle α, calculating a new development angle $\phi_o$, plotting a new scroll profile using the formula: $\rho=\rho_o+\phi b/\phi_o$ (for $0 \leqq \phi \leqq \phi_o$) and running a CFD simulation of blower performance of new scroll cage profiles plotted until optimum blower performance is determined.

DESCRIPTION OF THE INVENTION

Figure 1:
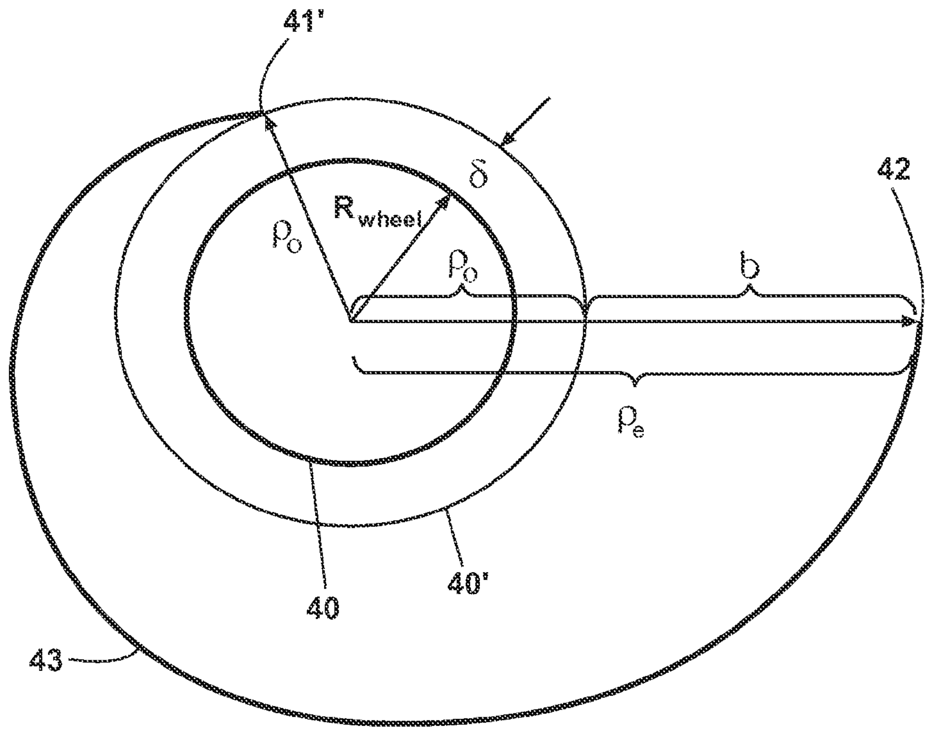
FIG. 1 identifies certain blower wheel and scroll cage dimensions for formulas used to determine the shape of a scroll cage according to the invention.
Figure 1A:
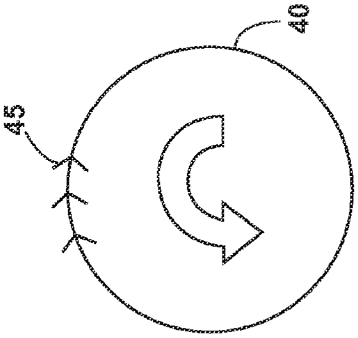
FIG. 1A is a partial schematic view of a forward-curved centrifugal blower wheel that can be used with a scroll cage profile according to the invention.

Air system design objectives for blowers applied to products such as a room air conditioner can include low noise and high air system efficiency with smooth air distribution and compact size utilizing a full development scroll. A forward-curved centrifugal drum-like blower wheel can satisfy air system design objectives for a room air conditioner. However, the configuration of the scroll cage and blower housing for a forward-curved centrifugal drum-like blower wheel significantly affects the air system performance. FIG. 1A shows, in schematic form, a forward-curved centrifugal blower wheel 40 having blades 45 curved forwardly relative to the direction of rotation shown by arrow 46. Those skilled in the art will recognize that blades 45 extend around the entire periphery of the blower wheel 40, and that the actual shape of the forward-curved blades 45 can be designed to achieve desired blower wheel performance as is well known in the art. If the profile of the scroll cage is not optimum, air system performance, namely, the volume flow rate (CFM), static pressure generated and power consumption can be unsatisfactory. The method of designing a scroll cage according to the invention can provide a scroll cage optimally designed within given geometry constraints in order to minimize losses when dynamic energy of air being circulated is converted to static energy in the scroll cage.

Figure 3:
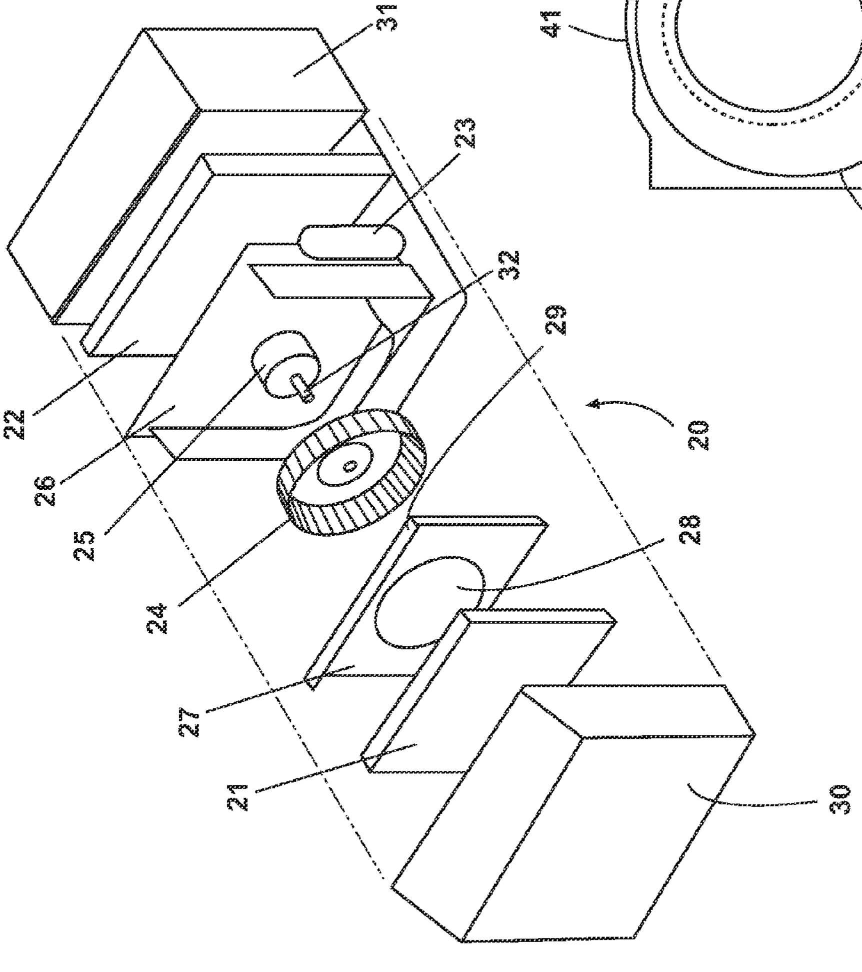
FIG. 3 is an exploded schematic view of a room air conditioner.

Turning to FIG. 3, an exploded schematic view of a typical window room air conditioner 20 can be seen. Room air conditioners can include an evaporator 21, a condenser 22, a compressor and expansion device 23, an evaporator blower wheel 24 driven by a fan motor 25 having a fan shaft 32. A condenser fan, not shown, can also be driven by fan motor 25. Fan motor 25 can be mounted on a divider wall 26 that can separate the evaporator side of the air conditioner from the condenser side of the room air conditioner. Divider wall 26 can form or can support a blower housing that includes a scroll cage for the evaporator blower wheel 24 as is well known in the art. A plate 27 can define an inlet 28 to the evaporator blower wheel 24, and wall 29 can define an outlet passage over evaporator 21 leading to a discharge hood and discharge openings, not shown, in the indoor portion 30 of the room air conditioner cabinet. The room air conditioner cabinet can also have an outdoor portion 31 to complete the cabinet. Both indoor portion 30 and outdoor portion 31 can have suitable inlet and discharge openings as is well known in the art.

A scroll cage can have two primary functions in an air moving system. First, the scroll cage collects the air sent by the moving blades of the centrifugal blower wheel. Second, the scroll cage mostly converts the pressure generated by the moving blower wheel from velocity head to static head. Theoretically, a scroll cage for a forward-curved blade centrifugal blower wheel is constructed based on a streamline of the fluid flow field. The fluid flow field generated by a forward-curved centrifugal blower wheel can be analyzed as a free vortex or spiral flow. Turning to FIG. 1, certain blower wheel and scroll cage dimensions used in formulas to determine the shape of an optimum scroll cage for a forward-curved centrifugal blower according to the invention can be seen. The dimensions of the blower wheel 40 are the radius $R_{wheel}$ and blower wheel depth, not shown. Blower wheel 40 dimensions can be determined by the air volume flow requirements of the air conditioner. Once the blower wheel dimensions are determined and the cabinet size is determined, the location of the blower shaft 32, and the blower housing dimensions can be determined as will be readily understood by those skilled in the art.

Centrifugal blower housings typically have a blower cut-off 41 located to substantially preclude recirculation of air moved by the rotating blower wheel. Distance $\rho_o$ is the distance from the center of the blower wheel 40 to the blower cut-off end 41'. Blade passing frequency noise generated by the blades 45 of blower wheel 40 passing blower cut-off end 41' can be controlled by selection of the radial wheel clearance δ, the distance between the blower wheel 40 and the blower cut-off end 41'. Distance $\rho_o$ can be calculated using the formula $\rho_o=R_{wheel}+\delta$. According to the invention, for a blower housing with parallel side walls, the radial wheel clearance $\delta$ can be 10 mm$\leqq\delta\leqq$20 mm. The circle 40' having a radius $\rho_o$ will sometimes be referred to as the blower circle to represent the blower wheel with a radius $R_{wheel}$ plus the radial wheel clearance $\delta$ provided to control blade passing frequency noise.

Distance $\rho_e$ is the distance from the center of the blower wheel 40 to the point 42 where the scroll cage is tangential to the blower housing wall. The tangential point will be referred to as the discharge point 42. Distance $\rho_e$ allows calculation of distance b that represents the distance between the blower housing wall and the blower wheel radius $R_{Wheel}$ plus radial wheel clearance $\delta$, or the distance $\rho_o$ that is the radius of the blower circle described above. Distance b can be a function of the width of the air conditioner cabinet. Distance b can be calculated using the formula: $b=\rho_e-\rho_o$.

Figure 2:
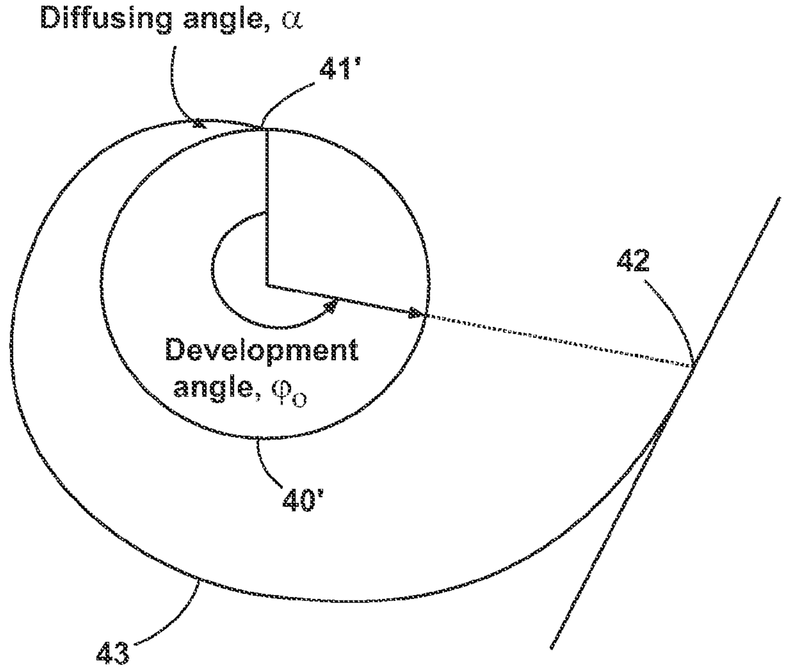
FIG. 2 identifies certain blower wheel and scroll cage angles for formulas used to determine the shape of a scroll cage according to the invention.

Turning to FIG. 2, certain blower wheel and scroll cage angles used in formulas to determine the shape of an optimum scroll cage for a forward-curved centrifugal blower according to the invention can be seen. Diffusing angle $\alpha$ is the angle between the blower circle 40' and the blower cut-off end 41' of the blower housing. As diffusing angle $\alpha$ is increased the volume flow rate (CFM) for a given blower wheel becomes larger. However, the relative amount of improvement in volume flow rate diminishes when the diffusing angle becomes too large. According to the invention, for a blower housing with parallel side walls, the diffusing angle $\alpha$ can be in the range from $8°<\alpha<13°$, with $\alpha=11°$ being optimum for many scroll cages. Development angle $\phi_o$ represents the polar angle distance between the radial line from the center of the blower wheel 40 to the blower wheel cut-off end 41' and the radial line from the center of the blower wheel 40 to the discharge point 42. According to the invention, for a blower housing with parallel side walls, the development angle $\phi_o$, can range from $245°<\phi_o<315°$, with $\phi_o=270°$ being optimum for many scroll cages. Development angle $\phi_o$ can be calculated by using the formula: $\phi_o \tan\alpha=(180/\pi)(b/\rho_o)$. The development angle formula sets forth the dynamic relationship among the parameters that can be used in determining a scroll cage profile. If $\phi_o$ and $\rho_o$ are fixed, increasing the distance b means the diffusing angle $\alpha$ will increase and accordingly the volume flow rate (CFM) will increase. When the distance b is fixed, the product of $\phi_o$ and $\tan\alpha$ becomes a constant which means that as the development angle $\phi_o$ becomes larger the value of $\tan\alpha$ becomes smaller. Thus, increasing the development angle $\phi_o$ from a smaller value leads to diffusing angle $\alpha$ falling into its efficient range. Normally, the volume flow rate (CFM) of a forward-curved blade blower wheel changes from a low rate to a high rate and back to a low rate as the parameters described above are changed. Thus, the method according to the invention involves determining an optimum development angle $\phi_o$. Those skilled in the art will also understand that changing the blade shape/angle of a forward-curved centrifugal blower wheel can also affect the optimum development angle $\phi_o$.

Once a development angle $\phi_o$ is calculated, the scroll cage profile 43 can be plotted in polar coordinates starting at the blower cut-off end 41' using the formula: $\rho=\rho_o+\phi b/\phi_o$ (for $0\leqq\phi\leqq\phi_o$). A scroll cage profile starting at the blower cut-off end 41' will end at the discharge point 42 located at $(\phi_o, \rho_e)$. Following calculation of a scroll cage profile, a simulation of blower performance for the scroll cage plotted can be prepared and run as will be understood by those skilled in the art.

Alternately, scroll cage profile 43 can also be plotted in polar coordinates starting at the discharge point 42 using the formula: $\rho=\rho_o+(\phi_o-\phi)b/\phi_o$ (for $0\leqq\phi\leqq\phi_o$). A scroll cage profile starting at the discharge point 42 will end at the blower cut-off end located at $(\phi_o, \rho_o)$. Using this formula the location of the blower cut-off end 41' can be determined if the discharge point 42 is fixed by the air conditioner cabinet dimensions.

Figure 5:
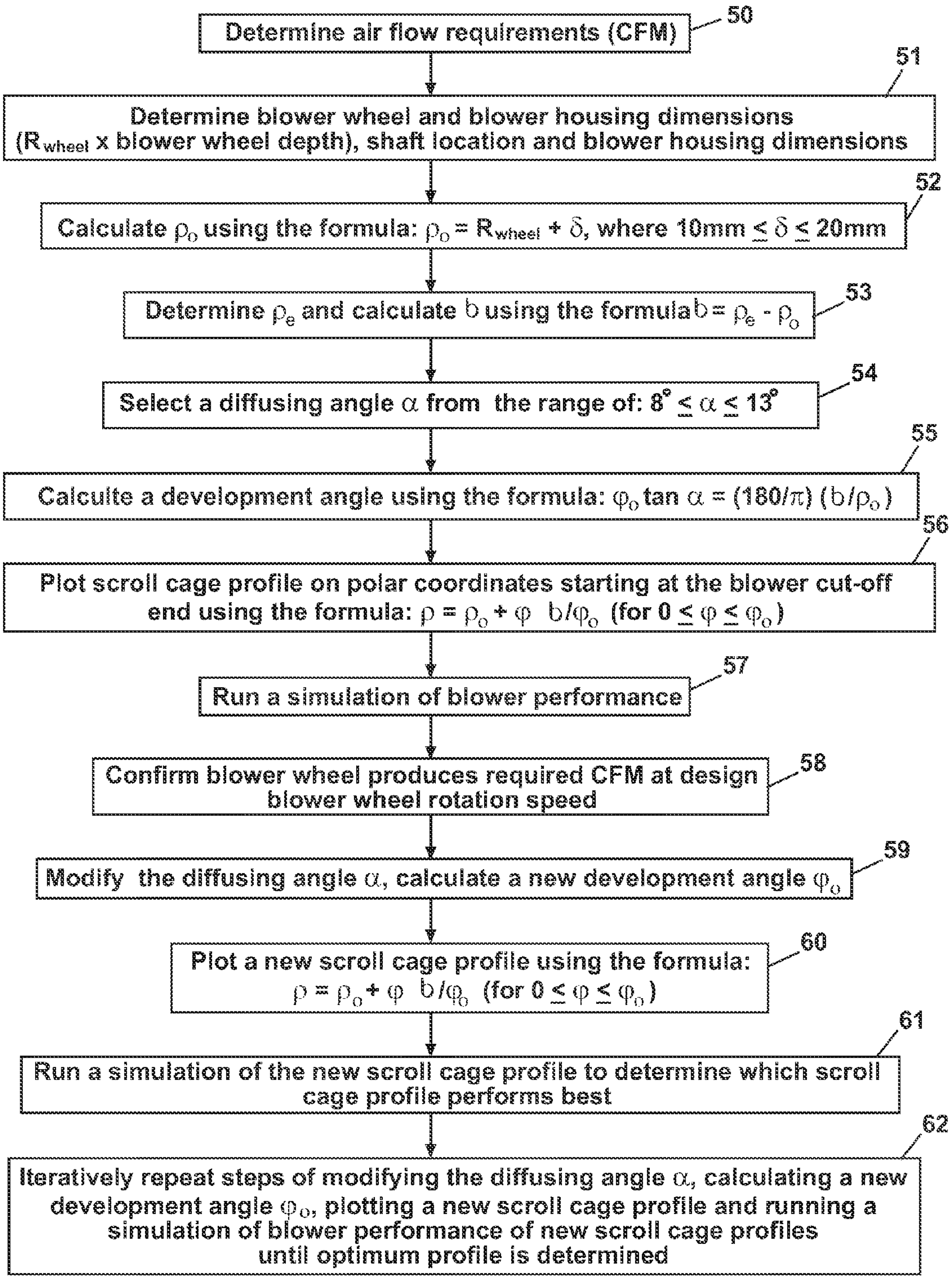
FIG. 5 is a flow chart illustrating the steps of the method of determining the shape of a scroll cage according to the invention.
Figure 6:
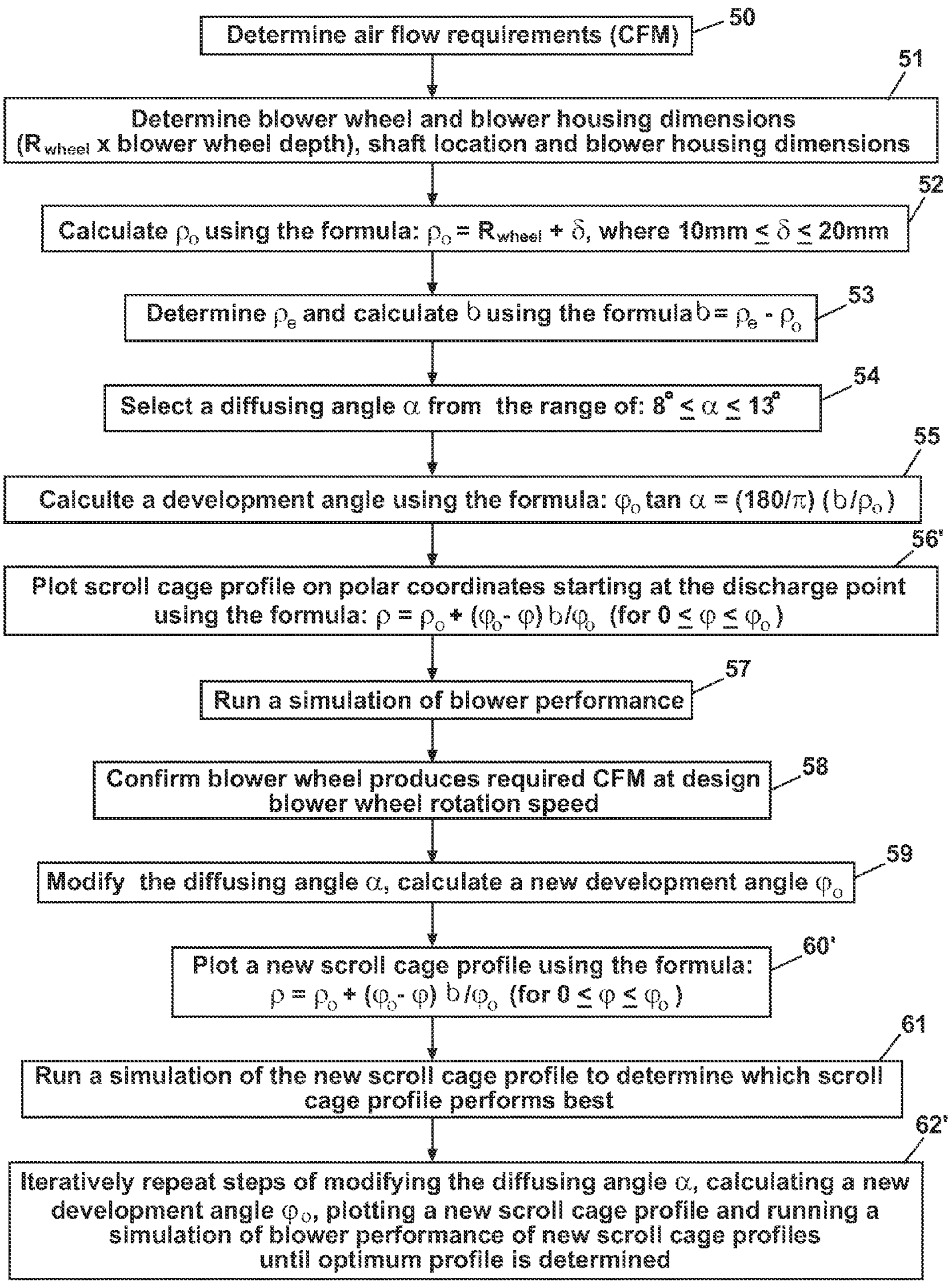
FIG. 6 is a flow chart illustrating the steps of an alternate method of determining the shape of a scroll cage according to the invention.

Turning to FIG. 5 and FIG. 6, the method for determining the shape a scroll cage for a forward-curved centrifugal blower wheel for a room air conditioner can be seen in chart form. The first step, 50, includes determining the air flow volume requirements (CFM) for the blower wheel scroll cage. In the case of a room air conditioner the air flow requirements of a can be determined by the cooling capacity, heat exchanger efficiency, dimensions and other design criteria for a particular room air conditioner. The second step, 51, includes determining the blower wheel dimensions, $R_{wheel}$×blower wheel depth, blower wheel motor shaft location and blower housing dimensions. Blower wheel dimensions can be determined by the required air flow volume requirements (CFM). In the case of a room air conditioner the blower wheel motor shaft location and blower housing dimensions can be determined by the cabinet and general layout of the unit, including blower wheel, condenser fan, compressor size and location. The third step, 52, includes calculating the distance $\rho_o$, that is the radius of a blower circle representing the radius of the blower wheel plus the radial wheel clearance $\delta$ between the blower wheel and the blower cut-off end 41'. Distance $\rho_o$ can be calculated using the formula: $\rho_o=R_{wheel}+\delta$, where $\delta$ is selected from the range 10 mm<$\delta$<20 mm as described above. The fourth step, 53, can include determining the distance $\rho_e$ and calculating the distance b. Distance b can be calculated using the formula: $b=\rho_e-\rho_o$ as described above. Distance $\rho_e$ can be determined by measuring the distance from the center of the blower wheel to the blower housing where the scroll cage 43 will be tangent to the blower housing at the discharge point 42. The fifth step, 54, can include selecting a diffusing angle $\alpha$ from the range: $8°<\alpha<13°$ as described above. The sixth step, 55, can include calculating a development angle $\phi_o$ using the formula: $\phi_o \tan\alpha=(180/\pi)(b/\rho_o)$ as described above. The next step can include plotting a scroll cage profile on polar coordinates. In the method illustrated in FIG. 5, the seventh step, 56, can include plotting the scroll cage on polar coordinates starting at the blower cut-off end 41' using the formula: $\rho=\rho_o+\phi b/\phi_o$ for polar angles of $\phi$ ranging from $0\leqq\phi\leqq\phi_o$ as described above. In the method illustrated in FIG. 6 the seventh step, 56', can include plotting the scroll cage starting at the discharge point 42 using the formula: $\rho=\rho_o+(\phi_o-\phi)b/\phi_o$ for polar angles of $\phi$ ranging from $0\leqq\phi\leqq\phi_o$ as described above. The eighth step 57 can include running a simulation of blower performance using the scroll cage profile plotted in the seventh step, 56 or 56', to determine if the blower wheel and scroll cage will produce the desired performance results including air flow (CFM) and watts. Those skilled in the art will readily understand how to run a computational fluid dynamics (CFD) simulation of blower performance to determine if the scroll cage profile determined in the seventh step, 56 or 56', will produce the desired results. The ninth step, 58, includes confirming that the selected blower wheel produces the required air flow volume (CFM) at the design point blower wheel rotation speed (RPM). The ninth step can be accomplished by reviewing the results of the CFD simulation conducted in the eighth step, 57. The tenth step, 59, can include modifying the diffusing angle $\alpha$, calculating a new development angle $\phi_o$ as in the fifth step, 54, and sixth step, 55. The eleventh step, 60 or 60', can include using the results of the tenth step, 59, to plot a new scroll cage profile using the formula: $\rho=\rho_o+b/\phi_o$ (for $0\leqq\phi\leqq\phi_o$) in the method illustrated in FIG. 5, or using the formula: $\rho=\rho_o+(\phi_o-\phi)b/\phi_o$ (for $0\leqq\phi\leqq\phi_o$) in the method illustrated in FIG. 6 to determine a new blower wheel scroll cage profile. The twelfth step, 61, can include running a simulation for the new scroll cage profile to determine which scroll cage profile provides the best blower performance including evaluation of CFM and power consumption parameters. The simulation in the twelfth step, 61, can be the same as described in the eighth step 57 described above and can include confirming that the blower wheel produces required CFM and design blower wheel rotation speed as described in the ninth step, 58. The last step, 62 or 62', can include repeating the tenth through the twelfth steps until an optimum scroll cage profile is determined for the room air conditioner. The steps of modifying the diffusing angle $\alpha$ and recalculating $\phi_o$ and plotting a new scroll cage profile can be iterative steps, repeated until an optimum scroll cage profile or an optimum $\phi_o$ is determined. While the method of determining the shape of a scroll cage for a forward-curved blade centrifugal blower wheel illustrated in FIG. 5 and FIG. 6 includes thirteen steps, the method according to the invention can be practiced employing less than all of the thirteen steps if so desired. For example, the centrifugal blower and blower housing dimensions may be known so that the first three steps, 50 through 52, can be omitted. Similarly, thorough optimization may not be required so that the last step, 62, can be omitted. Also, as mentioned above, in some design situations certain parameters may be known or dictated by design criteria for the product the blower will be used in such as a room air conditioner. For example, the distance b may be controlled by product dimensions/fan shaft location so that in the fourth step, 53, parameter b can only be changed to a smaller dimension.

Figure 4:
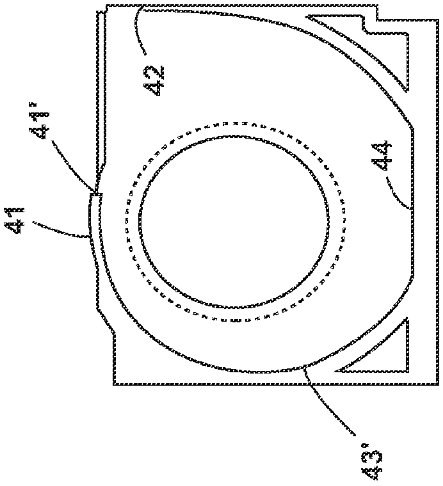
FIG. 4 is a partial view of blower housing showing locations of certain elements of a scroll cage shape that can be determined according to the invention.

Applicant has found that a scroll cage profile 43' such as shown in FIG. 4 can have a flattened portion 44 without disturbing blower performance. Thus, a scroll cage according to the invention can have a flattened portion such as portion 44 in FIG. 4 if cabinet dimensions do not permit a blower housing that includes a full scroll cage profile.

Figure 4A:
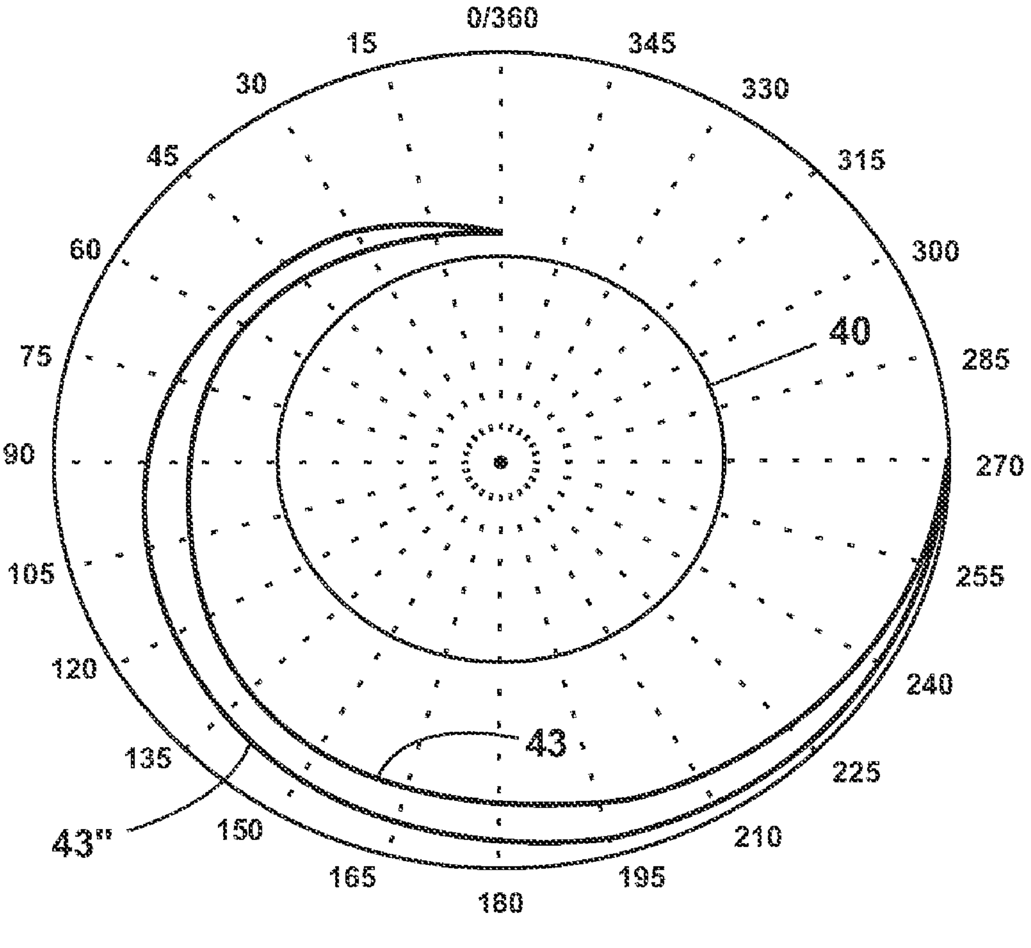
FIG. 4A is a plot of scroll cage profiles comparing a formula according to the invention with a parabolic term to a profile based on a formula according to the invention without a parabolic term.

Applicant has also found that a scroll cage profile 43" can be expanded as shown in FIG. 4A to improve blower performance if the product in which the blower will be used allows. Scroll cage profile 43" can be expanded by the addition of a parabolic term to the formula used to plot the scroll cage profile: $\rho=\rho_o+b\phi/\phi_o+\Delta\rho_o 4\phi/\phi_o(1-\phi/\phi_o)$, for $0\leqq\phi\leqq\phi_o$, where $\Delta\rho_o 4\phi/\phi_o(1-\phi/\phi_o)$, for $0\leqq\phi\leqq\phi_o$, is the added parabolic term. $\Delta\rho_o$ is the largest additional space that the scroll profile can be extended radially. In the case of most room air conditioners, the value of $\Delta\rho_o$ is in the range: $0\leqq\Delta\rho_o\leqq 20$ mm. When $\Delta\rho_o$ is reduced to zero, the formula becomes the regular formula. The parabolic term can be added to the alternate formula for plotting a scroll cage profile: $\rho=\rho_o+(\phi_o-\phi)b/\phi_o+\Delta\rho_o 4\phi/\phi_o(1-\phi/\phi_o)$, for $0\leqq\phi\leqq\phi_o$. Thus, the parabolic term can be added to either formula used plotting the profile of the scroll cage, either starting from the cut-off end 41' or from the discharge point 42 as described in detail above. Turning to FIG. 4A, a scroll cage profile 43" plotted using the formula described above having an added parabolic term with $\Delta\rho_o=20$ mm can be seen with a scroll cage profile 43 plotted using the formula without the parabolic term. The parameters of $\rho_o=110$ mm, b=90 mm, $\phi_o=270°$ are used for both profiles in this comparison.

Once an optimum scroll cage profile is determined, the scroll cage profile with final parameters of $\rho_o$, b and $\phi_o$ can be converted to a blower housing design as will be readily understood by those skilled in the art.

While the invention has been specifically described in connection with certain specific embodiments thereof, it is to be understood that this is by way of illustration and not of limitation, and the scope of the appended claims should be construed as broadly as the prior art will permit.

I claim:

1. A method for determining the shape of a scroll cage for a forward-curved centrifugal blower wheel in a blower housing having a blower cut-off end comprising:

determine the blower wheel dimensions ($R_{wheel}\times$blower wheel depth);

calculate $\rho_o$, the radius of a blower circle, comprising the distance from the center of the blower wheel to the blower cut-off end, using the formula: $\rho_o=R_{wheel}+\delta$, where $\delta$, the radial wheel clearance, is selected from the range of: 10 mm $\leqq\delta\leqq$20 mm;

determine $\rho_e$, the distance from the center of the blower wheel to a discharge point of the scroll cage at the tangential point of the scroll cage and the blower housing, and calculate b, the difference between $\rho_e$ and $\rho_o$ using the formula: $b=\rho_e-\rho_o$;

select a diffusing angle $\alpha$, the angle between the blower circle and the blower cut-off at the blower cut-off end, from the range of: $8°<\alpha<13°$;

calculate a development angle $\phi_o$, the polar angle between the radial line from the center of the blower wheel to the blower cut-off end and the radial line from the center of the blower wheel to the discharge point, using the formula: $\phi_o \tan\alpha=(180/\pi)(b/\rho_o)$; and plot the scroll cage profile on polar coordinates starting at the cut-off end using the formula: $\rho=\rho_o+\phi b/\phi_o$ (for $0\leqq\phi\leqq\phi_o$) where $\rho$ is the distance from the center of the blower wheel to the scroll cage and ending at the discharge point at ($\phi_o$, $\rho_e$).

2. The method for determining the shape of a scroll cage of claim 1 further comprising:

run a simulation of the blower performance for the scroll cage profile plotted;

modify the diffusing angle $\alpha$, and calculate a new development angle $\phi_o$;

plot a new scroll cage profile using the formula: $\rho=\rho_o+\phi b/\phi_o$ (for $0\leqq\phi\leqq\phi_o$); and run a simulation of blower performance for the new scroll cage plotted to determine which scroll cage profile provides the best blower performance.

3. The method for determining the shape of a scroll cage of claim 2 further comprising:

iteratively repeating the steps of modifying the diffusing angle $\alpha$, calculating a new development angle $\phi_o$, plotting a new scroll cage profile using the formula: $\rho=\rho_o+\phi b/\phi_o$ (for $0\leqq\phi\leqq\phi_o$), and running a simulation of blower performance for the new scroll cage profiles plotted until optimum blower performance is determined.

4. The method for determining the shape of a scroll cage of claim 1 wherein the formula for plotting the scroll cage profile is: $\rho=\rho_o+b\phi/\phi_o+\Delta\rho_o 4\phi/\phi_o(1-\phi/\phi_o)$ for $0\leqq\phi\leqq\phi_o$, where $\Delta\rho_o$ is the largest additional space that the scroll profile can be extended radially and the value of $\Delta\rho_o$ is in the range: $0<\Delta\rho_o<20$ mm.

5. A method for determining the shape of a scroll cage for a forward-curved centrifugal blower wheel in a blower housing having a blower cut-off end comprising:

determine the blower wheel dimensions ($R_{wheel}\times$blower wheel depth);

calculate $\rho_o$, the radius of a blower circle, comprising the distance from the center of the blower wheel to the blower cut-off end, using the formula: $\rho_o = R_{wheel} + \delta$, where δ, the radial wheel clearance, is selected from the range of: 10 mm≦δ≦20 mm;

determine $\rho_e$, the distance from the center of the blower wheel to the discharge point of the scroll cage at the tangential point of the scroll cage and the blower housing, and calculate b, the difference between $\rho_e$ and $\rho_o$ using the formula: $b = \rho_e - \rho_e$;

select a diffusing angle α, the angle between the blower circle and the blower cut-off at the blower cut-off end, from the range of: 8°<α<13°;

calculate a development angle $\phi_o$, the polar angle between the radial line from the center of the blower wheel to the blower cut-off end and the radial line from the center of the blower wheel to the discharge point, using the formula: $\phi_o \tan \alpha = (180/\pi)(b/\rho_o)$; and plot the scroll cage profile on polar coordinates starting at the discharge point using the formula: $\rho = \rho_o + (\phi_o - \phi)b/\phi_o$ (for $0 \leqq \phi \leqq \phi_o$) where ρ is the distance from the center of the blower wheel to the scroll cage and ending at the blower cut-off end at $(\phi_o, \rho_o)$.

6. The method for determining the shape of a scroll cage of claim 5 further comprising:

run a simulation of the blower performance for the scroll cage profile plotted;

modify the diffusing angle α, and calculate a new development angle $\phi_o$;

plot a new scroll cage profile using the formula: $\rho = \rho_o + (\phi_o - \phi)b/\phi_o$ (for $0 \leqq \phi \leqq \phi_o$); and run a simulation of blower performance for the new scroll cage profile plotted to determine which scroll cage profile provides the best blower performance.

7. The method for determining the shape of a scroll cage of claim 6 further comprising:

iteratively repeating the steps of modifying the diffusing angle α, calculating a new development angle $\phi_o$, plotting a new scroll profile using the formula: $\rho = \rho_o + (\phi_o - \phi)b/\phi_o$ (for $0 \leqq \phi \leqq \phi_o$), and running a simulation of blower performance for the new scroll cage profiles plotted until optimum blower performance is determined.

8. The method for determining the shape of a scroll cage of claim 5 wherein the formula for plotting the scroll cage profile is: $\rho = \rho_o + (\phi_o - \phi)b/\phi_o + \Delta\rho_o 4\phi/\phi_o(1 - \phi/\phi_o)$, for $0 \leqq \phi \leqq \phi_o$, where $\Delta\rho_o$ is the largest additional space that the scroll profile can be extended radially and the value of $\Delta\rho_o$ is in the range: $0 < \Delta\rho_o < 20$ mm.

9. A method for determining the shape of a scroll cage of a blower housing having a blower cut-off end for a forward-curved centrifugal blower wheel for use in a room air conditioner comprising:

determine the air flow requirements (CFM) for the room air conditioner;

determine the blower wheel dimensions ($R_{wheel}$×blower wheel depth), blower wheel shaft location and blower housing dimensions based on room air conditioner performance objectives and cabinet dimensions;

calculate $\rho_o$, the radius of a blower circle, comprising the distance from the center of the blower wheel to the blower cut-off end, using the formula: $\rho_o = R_{wheel} + \delta$, where δ, the radial wheel clearance, is selected from the range of: 10 mm ≦δ≦20 mm;

determine $\rho_e$, the distance from the center of the blower wheel to the discharge point of the scroll cage at the tangential point of the scroll cage and the blower housing, and calculate b, the difference between $\rho_e$ and $\rho_o$ using the formula: $b = \rho_e - \rho_o$;

select a diffusing angle α, the angle between the blower circle and the blower cut-off at the blower cut-off end, from the range of: 8°<α<13°;

calculate a development angle $\phi_o$, the polar angle between the radial line from the center of the blower wheel to the blower cut-off end and the radial line from the center of the blower wheel to the discharge point, using the formula: $\phi_o \tan \alpha = (180/\pi)(b/\rho_o)$; and plot the scroll cage profile on polar coordinates starting at the cut-off end using the formula: $\rho = \rho_o + \phi b/\phi_o$ (for $0 \leqq \phi \leqq \phi_o$ where ρ is the distance from the center of the blower wheel to the scroll cage and ending at the discharge point at $(\phi_o, \rho_e)$.

10. The method for determining the shape of a scroll cage of claim 9 wherein the formula for plotting the scroll cage profile is: $\rho = \rho_o + b\phi/\phi_o + \Delta\rho_o 4\phi/\phi_o(1 - \phi/\phi_o)$ for $0 \leqq \phi \leqq \phi_o$, where $\Delta\rho_o$ is the largest additional space that the scroll profile can be extended radially and the value of $\Delta\rho_o$ is in the range: $0 < \Delta\rho_o < 20$ mm.

11. The method for determining the shape of a scroll cage of claim 9 wherein a diffusing angle α of 11° is used to calculate the development angle $\phi_o$ using the formula: $\phi_o \tan \alpha = (180/\pi)(b/\rho_o)$.

12. The method for determining the shape of a scroll cage of claim 9 wherein a development angle $\phi_o$ of 270° is used to plot the scroll profile using the formula: $\rho = \rho_o + \phi b/\phi_o$ (for $0 \leqq \phi \leqq \phi_o$).

13. The method for determining the shape of a scroll cage of claim 9 wherein a diffusing angle α of 11° and a development angle $\phi_o$ of 270° are used to determine b using the formula: $\phi_o \tan \alpha = (180/\pi)(b/\rho_o)$ and to plot the scroll profile using the formula: $\rho = \rho_o + \phi b/\phi_o$ (for $0 \leqq \phi \leqq \phi_o$).

14. The method for determining the shape of a scroll cage of claim 9 further comprising:

run a computational fluid dynamics (CFD) simulation of the blower performance for the scroll cage profile plotted;

confirm a blower wheel having dimensions $R_{wheel}$×blower wheel depth is capable of producing required airflow (CFM) at a design blower wheel rotation speed;

modify the diffusing angle α, and calculate a new development angle $\phi_o$;

plot a new scroll cage profile using the formula: $\rho = \rho_o + \phi b/\phi_o$ (for $0 \leqq \phi \leqq \phi_o$); and run a CFD simulation of blower performance for the new scroll cage profile plotted to determine which scroll cage profile provides the best blower performance.

15. The method for determining the shape of a scroll cage of claim 14 further comprising:

iteratively repeating the steps of modifying the diffusing angle α, calculating a new development angle $\phi_o$, plotting a new scroll profile using the formula: $\rho = \rho_o + \phi b/\phi_o$ (for $0 \leqq \phi \leqq \phi_o$), and running a CFD simulation of blower performance of new scroll cage profiles plotted until optimum blower performance is determined.

16. A method for determining the shape of a scroll cage of a blower housing having a blower cut-off end for a forward-curved centrifugal blower wheel for use in a room air conditioner comprising:

determine the air flow requirements (CFM) for the room air conditioner;

determine the blower wheel dimensions ($R_{wheel}$×blower wheel depth), blower wheel shaft location and blower housing dimensions based on room air conditioner performance objectives and cabinet dimensions;

calculate $\rho_o$, the radius of a blower circle, comprising the distance from the center of the blower wheel to the blower cut-off end, using the formula: $\rho_o = R_{wheel} + \delta$, where $\delta$, the radial wheel clearance, is selected from the range of: 10 mm $\leqq \delta \leqq$ 20 mm;

determine $\rho_e$, the distance from the center of blower wheel to the discharge point of the scroll cage at the tangential point of the scroll cage and the blower housing, and calculate b, the difference between $\rho_e$ and $\rho_o$ using the formula: $b = \rho_e - \rho_o$;

select a diffusing angle $\alpha$, the angle between the blower circle and the blower cut-off at the blower cut-off end, from the range: $8 < \alpha < 13°$;

calculate a development angle $\phi_o$, the polar angle between the radial line from the center of the blower wheel to the blower cut-off end and the radial line from the center of the blower wheel to the discharge point, using the formula: $\phi_o \tan \alpha = (180/\pi)(b/\rho_o)$; and plot the scroll cage profile on polar coordinates starting at the discharge point using the formula: $\rho = \rho_o + (\phi_o - \phi)b/\phi_o$ (for $0 \leqq \phi \leqq \phi_o$) where $\rho$ is the distance from the center of the blower wheel to the scroll cage and ending at the blower cut-off end at $(\phi_o, \rho_o)$.

17. The method for determining the shape of a scroll cage of claim 16 wherein the formula for plotting the scroll cage profile is: $\rho = \rho_o + (\phi_o - \phi)b/\phi_o + \Delta\rho_o 4\phi/\phi_o(1 - \phi/\phi_o)$, for $0 \leqq \phi \leqq \phi_o$, where $\Delta\rho_o$ is the largest additional space that the scroll profile can be extended radially and the value of $\Delta\rho_o$ is in the range: $0 < \Delta\rho_o < 20$ mm.

18. The method for determining the shape of a scroll cage of claim 16 further comprising:

run a computational fluid dynamics (CFD) simulation of the blower performance for the scroll cage profile plotted;

confirm blower wheel having dimensions $R_{wheel}$×blower wheel depth is capable of producing required airflow (CFM) at a design blower wheel rotation speed;

modify the diffusing angle $\alpha$, and calculate a new development angle $\phi_o$;

plot a new scroll cage profile using the formula: $\rho = \rho_o + (\phi_o - \phi)b/\phi_o$ (for $0 \leqq \phi \leqq \phi_o$); and run a CFD simulation of blower performance for the new scroll cage profile plotted to determine which scroll cage profile provides the best blower performance.

19. The method for determining the shape of a scroll cage of claim 18 further comprising:

iteratively repeating the steps of modifying the diffusing angle $\alpha$, calculating a new development angle $\phi_o$, plotting a new scroll cage profile using the formula: $\rho = \rho_o + (\phi_o - \phi)b/\phi_o$ (for $0 \leqq \phi \leqq \phi_o$), and running a CFD simulation of blower performance of new scroll cage profiles plotted until optimum blower performance is determined.

* * * * *